United States Patent Office 3,403,020
Patented Sept. 24, 1968

3,403,020
LEACHING OF COPPER FROM ORES WITH CYANIDE AND RECOVERY OF COPPER FROM CYANIDE SOLUTIONS
George William Lower, Bethel, Conn., assignor to American Cyanamid Company, Stamford, Conn., a corporation of Maine
No Drawing. Filed Dec. 14, 1964, Ser. No. 418,324
13 Claims. (Cl. 75—106)

ABSTRACT OF THE DISCLOSURE

Copper is recovered from ores and ore fractions containing cuprous and cupric sulfides, oxides, carbonates and other copper bearing minerals by leaching with an alkaline solution containing 3 to 4.5 moles of cyanide per mole of extractable copper, which reduces divalent copper to monovalent copper, and solubilizes the copper as cuprocyanide. Air need not be excluded. The major proportion of cyanide is recycled, by separating the copper in solution from residues, acidifying the solution to below about pH 5 in the presence of sulfide plus thiocyanate plus ferrocyanide ions, to precipitate the copper and free HCN, and stripping the HCN from the slurry by steam, or other gas without filtering the slurry, and recovering and recycling the cyanide.

Alternatively, the leached solution can be acidified, without separating the leached solids, to precipitate copper in readily froth floatible form, stripping HCN from the slurry, for recovering and recycling; the copper is then froth floated from the ore, the copper being in readily separable form.

---

Related cases.—U.S. Patent 3,189,435, G. W. Lower, "Leaching of Copper From Ores With Cyanide and Recovery of Copper From Cyanide Solution," June 15, 1965, issued on copending application Serial No. 415,208, filed December 1, 1964, a continuation-in-part of Serial No. 175,349, filed February 23, 1962, now abandoned; said patent discloses recovery of copper from a cyanide leach.

This invention relates to the recovery and recycling of cyanide in processes for the beneficiation of copper-containing ore and ore fractions, particularly processes in which copper is dissolved from mineral components in an aqueous alkaline cyanide-containing solution, and the copper is precipitated from the solution by the addition of an acid in the presence of at least one copper precipitant such as sulfide ion, thiocyanate ion and ferrocyanide ion, and the sum of the three is about stoichiometrically equal to the recoverable copper, and cyanide is recovered by stripping off hydrogen cyanide in the vapor phase with a gas or steam.

Cyanide has long been used for the recovery of gold from gold ores, by leaching of the ore. In a gold leach, the presence of oxygen is essential, the leach is for at least about 24 to 48 hours, and copper has been regarded as a cyanicide, that is, cyanide is consumed in the process, resulting in a loss of cyanide, and increasing costs. The recovery of copper by cyanide leaching, in the absence of noble metal values, has not been considered economically feasible.

At present copper sells at about 32 to 34 cents per pound. Sodium cyanide sells at about 18 to 20 cents per pound.

Although copper can be dissolved by cyanide, if the cyanide losses are too high, extraction of copper by cyanide is not economically practical.

The present method of recovery and recycling cyanide employs more cyanide than would be economically practical, if lost, but enough cyanide is recovered for reuse so that the process renders practical and economical the cyanidation of copper ores to extract and recover copper.

Where not otherwise limited by context, the term "ore fraction" is intended to include the ores themselves, as mined, crushed or ground to treatable size, both rich and lean, as well as selected portions such as fines or slimes from any of the grinding operations, before or after flotation, sands or any sands fractions of any size in which the reduction of ore particles is small enough that an economic fraction of the copper-containing minerals are exposed to action by reagents, cleaner tailings, rougher tailings, rougher concentrates, cleaner concentrates, and slags, including converter slags and reverberatory slags. With slags, grinding or other methods of attrition may be necessary in order that the subdivision be fine enough to permit attack on the individual copper bearing particles by cyanide solution.

The ore fraction may contain both sands and slimes. The slimes are the finely-divided, difficultly-filterable particles, which frequently are difficult to handle because of the large surface to weight ratio. Sands are larger particles, usually from a classification step, and are more amenable to flotation. Hence, circuits are useful in which the slimes are treated directly with cyanide leaching, and the sands are floated, with part or all of the concentrate sent to the smelter as in conventional processing, and with part of the tailings, or cleaner tails treated by cyanide leaching. The economics of cyanide leaching of each fraction may be separately considered. The preferred circuit varies with the type of ore treated, the richness of ore, and availability of water, cyanide, sulfide, and acid. The most economical circuit for a specific ore or ore fraction can be chosen using the principles set forth herein as applied to the conditions that prevail at a specific ore processing operation.

The present process gives good results with sulfide ores, oxide ores and mixed ores.

As used herein, the term "sulfide ores" includes the more common sulfide minerals, such as chalcocite ($Cu_2S$), digenite ($Cu_9S_5$), and covellite ($CuS$), as well as mixed sulfides such as bornite ($Cu_5FeS_4$), enargite ($Cu_3AsS_4$), and tetrahedrite ($Cu_{12}Sb_4S_{13}$).

The term "oxide ores" is used to cover the ores in which the copper occurs as an oxide or carbonate such as azurite ($CuCO_3 \cdot Cu(OH)_2$), malachite ($Cu_2(OH)_2CO_3$), cuprite ($Cu_2O$), tenorite ($CuO$), and forms of chrysocolla, which is a silicate mineral of copper.

The term "mixed ores" is used to cover ores in which the copper occurs as both sulfide minerals and oxide minerals and the proportion of each is large enough that for reasonably economic recovery both types of copper minerals need to be considered in the metallurgy. Sulfide ores which are completely free from oxide, or oxide ores which are completely free from sulfides are unusual. Ores exist in which the proportion of oxides in a sulfide ore or sulfide in an oxide ore is so low that for metallurgical recovery purposes the ore may be considered as essentially the sulfide or an oxide type. Similarly, in working with slags the same classification can be used and in working with ore fractions the same terminology is applicable.

Fortunately, in the present process, minor modifications in ratios only are required to provide for sulfide, oxide and mixed ores and, in general, any of the ore fractions may be treated rapidly, efficiently and effectively by adjusting the quantity of reagents in accordance with the present invention so that sufficient cyanide is present to dissolve all of the recoverable copper in the particular ore fraction and sufficient sulfide, thiocyanate, and ferrocyanide ion are present during precipitation that cyanide is not unnecessarily consumed during recovery operations.

It is to be understood that in some ores part of the copper is present in inclusions so fine that it is uneconomical to grind the ore fine enough to release all of the copper and such inclusions can be considered as nonrecoverable copper.

As is obvious to those skilled in the art, the exact proportions, ratios, and treatments, including the choice of crude calcium cyanide, gaseous hydrogen cyanide, or alkali or alkaline earth cyanide, including ammonium cyanide, or organic α-hydroxy cyanides such as lactonitrile, as well as the grinding, water ratios, and other operating parameters are a function of economics and vary from time to time and mine to mine. In many instances the adequacy of water supply, the problems of waste disposal, the problems of transportation of chemicals to the mine, and the presence of available lime, alkali, or alkaline earth materials, for use as an absorber will change an economic picture and, hence, the preferred ratios and usages will vary from those given in the examples, depending on pertinent economic factors.

The present invention is based on the discovery that the copper values of ore fractions may be leached from the gangue and other minerals by an aqueous alkaline cyanide so that the copper is present in solution as predominantly a soluble cuprocyanide. On acidification, this cuprocyanide in soluble form is converted to and precipitated out as copper sulfide together with such quantities of copper thiocyanate and copper ferrocyanide as may be formed by the thiocyanate and ferrocyanide ions present, by adding sufficient sulfide ion in a soluble form, before acidification, in addition to the sulfide ion already present that the sum total of sulfide ion, thiocyanate ions and ferrocyanide ions present is sufficient to precipitate all of the copper, and release the hydrogen cyanide as free HCN. The HCN is stripped in gaseous form with a carrier gas, which term includes steam, from the copper-containing fraction. The cyanide thus stripped is condensed or absorbed and then recycled or recycled directly. The condensation may be affected by cooling of the steam containing HCN. Absorption may take place in an absorption tower with an alkali or alkaline earth hydroxide, including most economically, sodium hydroxide, calcium oxide, or hydroxide, or ammonia and, when economically available, other alkalis such as lithium hydroxide, potassium hydroxide, or others. The absorbants may be used as sprays, in stirred or baffled vessels, or in continuously operating absorption columns. Usually in the absence of a local source which distorts economic considerations, condensation to yield aqueous HCN or absorption to yield sodium cyanide or calcium cyanide or ammonium cyanide or mixtures thereof is preferable economically. This cyanide is then recycled into the cyanide leaching step. Conveniently, but not necessarily, the cyanide is recycled as a solution to avoid the cost of concentration. The recovered cyanide may be concentrated and reused where, for particular plant reasons, storage is desired but, usually, immediate recycling has economic advantages in reducing the cost of plant equipment.

The HCN freed by acidification and removed by stripping with air, nitrogen or other permanent gases and/or with steam may be recycled by passing directly into alkaline suspensions of copper-bearing mineral components and reused to dissolve copper. The stream of gas entering such suspensions acts as a means of agitation to facilitate leaching. The stream of entering gases, if above the mineral fraction temperature, seems to raise the temperature during the leaching operations and increases the rate of copper extraction. Thus, the cost of absorption or condensation are avoided without sacrificing efficiency of extraction.

The sulfide used to add sulfide is any soluble sulfide. Frequently sodium sulfide is the most economical but hydrogen sulfide, sodium hydrosulfide (NaSH), sodium sulfhydrate (NaSH), calcium sulfide, or calcium hydrosulfide, or mixtures are very effective. These may be used as pure, crude, hydrated or solutions as available. Other soluble sulfides may be used if economically available. A good source of sulfide is calcium sulfide from the reaction of calcium sulfate and coke. The quantities used must be adjusted for hydrate water, if present, or impurities if crude material or solutions are used.

In the operations, leaching of the ore, stripping of HCN and absorption of the HCN, countercurrent techniques, long known to the mining industry, are usually but not necessarily used. In the leaching operation a short-time, under an hour, is adequate for solution of copper by the cyanide. Somewhat longer contact may be used where from plant considerations, immediate treatment is not convenient.

In leaching operations a comparatively high solids ratio is usually preferred for countercurrent leaching, followed by countercurrent washing so that the discarded gangue has a minimum content of cyanide and solution in trapped water. Depending upon the ore and the size of subdivision, conventional thickeners or filters are used to separate the leach solution and wash water. A multi-stage leach and multi-stage wash reduce losses, but add to treatment costs, so an economic compromise is used commercially.

As a matter of operating convenience the leach solution is usually separated from the ore before an attempt is made to recover the copper. Where the ore has a compartively small amount of acid-consuming substances, such as lime, the extracted ore in the presence of the leach solution, may be acidified in the presence of sufficient sulfide, thiocyanate and ferrocyanide to precipitate all the copper so that the copper is present as separate, free, and hence, readily floatable sulfide, thiocyanate and ferrocyanide, which may be floated from the mixture of gangue without a separate liquid-solid separation step.

The cyanide is usually stripped before precipitated solids are separated from the residual solutions, although this order may be reversed if plant equipment is more adaptable for the reverse process. Gas tight reactors, filters, etc. are required. HCN is very poisonous, so great care is required in any operation where HCN may escape.

The concept of dissolving out sulfides and other copper components and then reprecipitating in the presence of the gangue is unique. It permits a far more effective flotation as the copper minerals are freed from adherent gangue and, hence, a high recovery of concentrate of high grade can be obtained.

Usually to reduce the size of treatment vessels the liquid-solid separation is performed first and the copper is precipitated from the separated solution and washings after the gangue has been discarded. It is to be understood that the choice of processing can vary with the degree of richness of the ore fraction being treated, as well as the physical particle size which controls the convenience of liquid-solid separation and flotation.

All operations, other than steam stripping, can be performed at ambient temperatures and pressure, from about 5° C. for cold areas in winter to about 35–40° C. for hot areas in summer. The pressure can be normal sea level atmospheric, or the reduced pressure of high altitude mines. Pressure vessels and/or higher pressures and/or temperatures are useful, but increased leaching rates, and increased filtering or settling rates frequently may not be of sufficient economic value to pay for the cost of heat.

Ores containing chrysocolla, a copper silicate ($CuSiO_3 \cdot H_2O$), and related silicates are more effectively leached while hot. Hence, this difficultly treatable mineral makes a substantial contribution in ores treated by the present process, particularly with hot leaching.

If by-product or waste heat is available, hot leaching and steam stripping become more advantageous economically.

Chalcopyrite ($CuFeS_2$) leaches more slowly than most copper minerals. It is extremely easy to float, so that a flotation of chalcopyrite before or after and in addition to the cyanide leach can offer a combined treating step flow sheet of interest. The cyanide leach frees the chalcopyrite so that a subsequent flotation gives good recoveries, particularly if particles of copper minerals in the ore are masked by more cyanide soluble fractions.

Ores with a major fraction of chalcopyrite may be leached, sulfided, acidified, the cyanide stripped off, and then floated, so that chalcopyrite reports with the cuprosulfide, and a high grade concentrate is rapidly obtained.

In conventional cyanide treatment of precious metal ores, the gold and silver are displaced by zinc, and separately recovered. In the present process the precious metals, if present report with the cuprosulfide, go through the smelter, into the blister copper, and are recovered as slimes from the conventional electrorefinery step. Hence, gold and silver appear as a by-product with no extra effort or cost required to recover them.

Among the equations involved are:

$Cu_2S + 6CN^- = 2Cu(CN)_3^= + S^=$
$Cu_2O + 6CN^- + H_2O = 2Cu(CN)_3^= + 2OH^-$
$2CuCO_3 + 8CN^- = 2Cu(CN)_3^= + 2CO_3^= + (CN)_2$
$(CN)_2 + 2OH^- = (CNO)^- + (CN)^- + H_2O$
$2CuS + 8CN^- = 2Cu(CN)_3^= + 2S^= + (CN)_2$
$(CN)_2 + 2OH^- = CNO^- + CN^- + H_2O$
$2Cu(CN)_3^= + S^= + 3H_2SO_4 = Cu_2S + 6HCN + 3SO_4^=$

As will be seen, the cation associated with the cyanide is not important. For purposes of calculation and expression, even if added as calcium cyanide, crude or free, or hydrogen cyanide or otherwise, to express the quantities added, it is convenient to consider all forms of cyanide as sodium cyanide equivalent, and the examples are so written.

Roughly, 50 pounds of sodium cyanide (NaCN) equals 46 pounds of calcium cyanide Ca(CN)$_2$ equals 27 pounds of hydrogen cyanide (HCN).

Example 1.—Sulfide ore cleaner tailings

A cleaner tailing from the flotation of a sulfide ore, which tailings contained 3.90% copper, mainly as chalcocite (Cu$_2$S), was leached for 1 hour at 40% by weight solids with a crude calcium cyanide in such quantity that the molar ratio of cyanide to copper was 3.5. All parts and percentages are by weight unless otherwise stated.

For purposes of convenience the crude calcium cyanide is rated on a weight basis as the cyanide equivalent of a certain weight of sodium cyanide. The cation is not important. The amount of contained cyanide which is available is the determining factor in calculating molar ratios.

The resulting slurry was filtered and the solids washed. The extracted and washed tailings were discarded.

The copper was precipitated from the pregnant solution (filtrate and washings) by adding 0.22 part of NaHS (sodium hydrosulfide) per part of dissolved copper, which was 50% of the theoretical amount, and then acidifying to a pH of 3 with sulfuric acid. The amount of sulfide ion both originally present and added, plus thiocyanate already present in the solution was sufficient to give over 1 equivalent of combined sulfide and thiocyanate ion per equivalent of copper in the solution. The cyanide, as HCN, released was stripped from the slurry with air and absorbed by a 20% aqueous sodium hydroxide solution in a scrubber. The copper recovery from the ore fraction was 84.5%. The grade of the copper precipitate was 16.5% Cu. The cyanide consumption was 0.32 part of sodium cyanide equivalent per part of copper recovered (equivalent to about 1.0 part of sodium cyanide equivalent per 100 parts of ore treated). About 90.2% of the original cyanide was recovered.

The sodium cyanide solution from the absorber was used as a source of cyanide in subsequent operations in which subsequent portions of the same cleaner tailing were then treated with a mixture of crude calcium cyanide and recovered sodium cyanide. For purposes of convenience the sodium cyanide recovered was recycled as a solution to avoid the cost of concentrating the solution.

Example 2.—Oxide ore

An oxidized copper ore containing mainly cuprite (2.1% Cu), after grinding, was leached with technical grade calcium cyanide for 1 hour at a mol ratio of NaCN equivalent to copper of 3:1. The resulting pregnant solution was separated from the leach residue by filtration and the copper precipitated from the filtrate and washings by adding 0.6 part CaS per part of copper and acidifying to a pH of 2.0 with H$_2$SO$_4$. The hydrocyanic acid released was stripped from the slurry with steam and recovered as about a 26% HCN aqueous solution. Copper recovery was 92%, the grade of the copper precipitate was 16.7% Cu, and cyanide recovery was 93% of the cyanide initially added.

A second sample of the same ore was leached with the recovered HCN plus lime at a cyanide to copper ratio of 3:1 for 1 hour. Copper extraction was again 92%, showing that the recovered cyanide was as efficient an extractant as that originally added in the first leaching operation.

Example 3.—Mixed sulfide-oxide ore; scavenger tails

A scavenger flotation tailing (1.05%) Cu), containing chalcocite (Cu$_2$S), chalcopyrite, cuprite (Cu$_2$O), and other oxidized minerals was leached with crude calcium cyanide at a mole ratio of NaCN equivalent to contained copper of 3.1:1. After ¼ hour the leach residue was separated from the pregnant solution by filtration, the residue washed with water and the resulting pregnant solution, including washings, treated with 0.18 part NaHS per part of copper and then acidified to pH 2.5 with sulfuric acid to precipitate the copper. Cyanide was recovered from the acidified slurry by stripping with steam from an external source, and condensing to an aqueous HCN solution of about 26% HCN. Overall copper recovery was 67.2% and the grade of the copper precipitate was 16.2% Cu. Cyanide consumption was 0.5 part NaCN equivalent per part of copper recovered. 87.4% of the original cyanide was recovered.

A second sample of the scavenger flotation tailing was similarly treated with the recovered HCN solution and lime.

After the removal of HCN, the acidified suspension containing the precipitated copper was treated by flotation with 0.05 lb./ton allyl amyl xanthate as promoter and 0.05 lb./ton pine oil as frother, and a copper concentrate removed. Copper recovery was 99.2%. The grade of the copper concentrate was 49.2% Cu.

The principal impurity in the precipitate from cyanide stripping was gypsum. As the gypsum is a good flux in smelting, the gypsum-containing cuprosulfide may be smelted direct. As the precipitate is essentially iron free, good smelting characteristics are obtained with minimum losses. The floated high grade cuprosulfide is particularly advantageous if smelter capacity is limited, or the concentrate is to be shipped long distances.

Example 4.—Copper smelter slag

A copper converter slag (5.88% Cu) containing metallic copper, copper oxide, and copper sulfide, after grinding, was leached for 2 hours with crude calcium cyanide at a cyanide to copper weight ratio of 3.7:1 and 60% solids. The copper was precipitated by adding 0.25 part of sodium hydrosulfide (NaHS) per part of dissolved copper followed by acidification to pH 3.5 with H$_2$SO$_4$. The released cyanide (HCN) was steam stripped from the acid slurry and recovered by condensation as a 26% aqueous HCN solution. Copper recovery was 93.6%. The grade of the copper precipitate was 16.7% Cu, and cyanide recovery was 95% of the original cyanide added.

Example 5.—Copper-gold ore

An oxidized copper-gold ore (2.7% Cu. 0.388 oz. Au/T) in which the major copper minerals were malachite and azurite, and which contained cuprite and other oxidized copper minerals plus a small amount of sulfide copper, was leached for 4 hours with a crude calcium cyanide at weight ratio of NaCN equivalent to copper of 3.48:1, at 30% solids. The pregnant solution containing the dissolved copper and gold was removed from the leach residue by filtration, and the residue washed. To this combined pregnant solution 0.7 part of $Na_2S$ per part of soluble copper was added and both the copper and gold precipitated by acidifying to pH 3.0 with $H_2SO_4$. The released HCN was then stripped from the slurry with air at 80° C. and the HCN recovered in a sodium hydroxide absorbing solution. Copper extraction from the ore was 76.6% Cu and gold extraction was 93.2% Au. Over 99% of the extracted copper and 98.4% of the extracted gold were recovered from the pregnant solution in the precipitation process. Cyanide recovery was 83% of the initial cyanide added. The precipitate assayed 13.8% Cu and 2.530 oz. Au/ton.

The absorbing solution was used on a subsequent fraction with equally successful results.

Example 6.—Leach-precipitation-flotation

A flotation cleaner tailing containing 4.0% copper was leached in a Fagergren flotation machine for 30 minutes with crude calcium cyanide, at a pH about 12 and 20% solids and about 3½ moles NaCN equivalent per mole of copper. To the resulting ore slurry 0.27 part of NaHS per part of soluble copper was added and the pH adjusted to 3.0 with sulfuric acid to precipitate the soluble copper.

The slurry was aerated for 2 hours to remove HCN, the HCN being recovered in a calcium hydroxide adsorber. The precipitated copper was removed from the ore residue slurry by flotation. Copper recovery from the ore was 83%, and cyanide recovery was 88.2%. The grade of the floated copper pprecipitate was 22.1% Cu.

The recovered calcium cyanide containing excess lime was reintroduced in a continuous cycle of leaching. Make-up crude calcium cyanide was added as required.

Example 7.—Simultaneous HCN absorption and leaching

A sample of a sulfide cleaner tailing (4.0% Cu) was leached with crude calcium cyanide for ½ hour at a cyanide (NaCN equivalent) to copper ratio of 3.0:1. The pregnant solution was recovered from the residue by filtration. To the pregnant solution, including washings, 0.20 part NaHS per part of soluble copper was added and the solution acidified to a pH of 3.0. The resulting acid slurry containing the precipitated copper was stripped of the released HCN with air. The air-HCN stream was passed through a Pachuca leaching vessel containing a fresh ore charge plus water and the requisite amount of lime, to maintain a pH above about 10 for 1½ hours. The stripping is the rate controlling step.

Thus the fresh ore-lime slurry acted as an absorber for the recovered HCN while simultaneously leaching copper from the new ore charge. A small amount of crude calcium cyanide (about 8% of that required) was added to the fresh ore charge to replace the cyanide consumed in the initial leaching operation. The second leach solution was filtered and the copper and cyanide recovered in the same manner as in the initial solution.

In the initial leach, copper recovery was 89.4% and cyanide recovery was 90.1%, and in the second (Pachuca) leach the copper recovery was 89.3% and the cyanide recovery 89.7%. The operation may be continuously operated.

Example 8.—Oxide-silicate copper ore

Separate sample of a copper ore (1.7% Cu) containing mainly malachite, azurite, cuprite and chrysocolla ($CuSiO_3$) in a dolomite gangue were leached with crude calcium cyanide at a cyanide (NaCN equivalent) to copper ratio of 3.5:1 for two hours at 30° C. and at 80° C. The resulting pregnant solutions were separated from the leach residues by filtration. To these solutions, including washings, 0.6 parts CaS per part of soluble copper were added and the pH adjusted to 3.0 with $H_2SO_4$. The released HCN was recovered by air stripping at 80° C. and absorption in aqueous sodium hydroxide. The precipitated copper was recovered by filtration.

At 30° C. copper recovery was 41.5% and cyanide recovery was 82%. At 80° C. copper recovery was 83.2% and cyanide recovery was 86%.

The cyanid e recovered was recycled to subsequent leaching operations.

Example 9–24

Several copper-bearing ore fractions were treated by methods generally similar to those described in Examples 1 to 8. The following table summarizes operational details involved in this work and demonstrates the efficacy of the invention for the recovery of cyanide from the leaching of a wide variety of copper-bearing ore fractions, with high recoveries of both copper and cyanide in economically useful forms.

TABLE

| Ex. | Ore Material | Cyanide | | Leaching Time, Hours | Sulfide | | Recovery | Percent Cyanide Recovered |
|---|---|---|---|---|---|---|---|---|
| | | Type [1] | Ratio [2] | | Type | Lbs./Lb. Cu | Percent Cu | |
| 9 | Sulfide Cleaner #1 Tailing (4.0% Cu) | $Ca(CN)_2$ | 3.5:1 | 1 | NaHS | 0.22 | 88.4 | 90.2 |
| | As in Example 1 except cyanide recovered by steam stripping and condensation to 26% HCN. | | | | | | | |
| 10 | Sulfide Cleaner #1 Tailing (4.0% Cu) | $Ca(CN)_2$ | 3.5:1 | 1 | NaHS | 0.04 | 88.2 | 91.1 |
| | As in Example 1 except acid slurry filtered to recover copper and then cyanide recovered by air stripping filtrate and absorption in lime slurry. | | | | | | | |
| 11 | Sulfide Cleaner #1 Tailing (4.0% Cu) | $Ca(CN)_2$ | 3.8:1 | 16 | NaHS | 0.08 | 91.0 | 88.0 |
| | As in Example 10 except cyanide recovered from filtrate by steam stripping and condensation to 26% HCN. | | | | | | | |
| 12 | Oxidized Ore #1, Mainly Cuprite (2.1% Cu) | $Ca(CN)_2$ | 3.0:1 | 1 | CaS | 0.60 | 91.8 | 93.0 |
| | As in Example 2 except cyanide recovered by steam stripping (26% HCN) and absorption in alkaline ore suspension. | | | | | | | |
| 13 | Oxidized Ore #1, Mainly Cuprite (2.1% Cu) | HCN, CaO | 3.0:1 | 1 | CaS | 0.60 | 92.0 | 92.6 |
| | As in Example 2 except leach with 99% HCN plus lime. Cyanide recovered by nitrogen stripping and absorption in lime. | | | | | | | |
| 14 | Oxidized Ore #1, Mainly Cuprite (2.1% Cu) | NaCN | 2.4:1 | 1 | NaHS | 0.45 | 82.7 | 91.0 |
| | As in Example 2 except leach with NaCN. Cyanide recovered by air stripping at 80° C. and absorption in NaOH. | | | | | | | |

TABLE—Continued

| Ex. | Ore Material | Cyanide Type [1] | Cyanide Ratio [2] | Leaching Time, Hours | Sulfide Type | Recovery Lbs./Lb. Cu | Recovery Percent Cu | Percent Cyanide Recovered |
|---|---|---|---|---|---|---|---|---|
| 15 | Oxidized Ore #2, Mainly Malachite (0.93% Cu) | Ca(CN)₂ | 4.1:1 | 1 | CaS | 0.60 | 71.2 | 82.1 |
| | As in Example 9. | | | | | | | |
| 16 | Scavenger Flotation Tailing Mixed Oxides-Sulfides (1.15% Cu). | Ca(CN)₂ | 3.1:1 | ¼ | NaHS | 0.18 | 69.8 | 87.4 |
| | As in Example 3 except cyanide recovered by air stripping and absorption in lime slurry. | | | | | | | |
| 17 | Copper-Gold Ore (2.7% Cu, 0.388 oz. Au/t) | Ca(CN)₂ | 4.2:1 | 4 | CaS | 0.60 | 76.6 (91.5 Au) | 84.1 |
| | As in Example 5 except cyanide recovered by steam stripping, and condensation to 26% HCN which was then concentrated to 90% HCN by distillation and recycled. | | | | | | | |
| 18 | Copper Smelter Slag (5.88% Cu) | Ca(CN)₂ | 3.1:1 | 2 | NaHS | 0.25 | 82.9 | 95.0 |
| | As in Example 4 except cyanide recovered by nitrogen stripping to eliminate explosion hazards and absorption in lime slurry. | | | | | | | |
| 19 | Copper-Lead Middling Product (9.3% Cu, 8.8% Pb). | NaCN | 3.0:1 | 1 | NaHS | 0.50 | 85.5 (0.28 Pb) | 88.0 |
| | As in Example 1. | | | | | | | |
| 20 | Copper-Lead-Zinc Converter Slag (16.1% Cu, 23.0% Pb, 11.3% Zn). | NaCN | 3.5:1 | 1 | NaHS | 0.50 | 83.6 0.10 Pb 2.0 Zn | 89.0 |
| | As in Example 9. | | | | | | | |
| 21 | Copper-Nickel Ore (3.06% Cu, 2.66% Ni) | Ca(CN)₂ | 4.0:1 | 1 | NaHS | 0.20 | 85.2 5.3 Ni | 90.1 |
| | As in Example 9. | | | | | | | |
| 22 | Copper-Nickel Ore (3.01%, 1.33% Ni) | Ca(CN)₂ | 4.5:1 | 2 | H₂S | 0.10 | 85.9 2.9 Ni | 91.1 |
| | As in Example 11. | | | | | | | |
| 23 | Copper-Silver Ore (3.03% Cu, 3.5 oz. Ag/t) | Ca(CN)₂ | 4.0:1 | 2 | NaHS | 0.40 | 88.2 94.1 Ag | 89.5 |
| | As in Example 7. | | | | | | | |
| 24 | Sulfide Flotation Concentrate (16.5% Cu) | HCN, CaO | 3.8:1 | 1 | CaS | 0.20 | 95.2 | 92.1 |
| | As in Example 7. | | | | | | | |

[1] Ca(CN)₂ is technical grade.  [2] Mole ratio of NaCN equivalent to contained copper.

In all of the above examples the cyanide recovered was reused in subsequent leaching operations. The recovered cyanide can be used for other purposes, if desired, and cyanide from an independent source used for the leaching.

The leaching was between pH 10 and 12. Usually the pH assumes a values around pH 12 without effort to control such pH. Leaching can be from pH 9 to over 12, but usually lime in the circuit stabilizes the pH between 10 and 12. If the pH is below 10, the risk of hazardous amounts of HCN escaping is economically disadvantageous.

As illustrative of a complete flow sheet using this invention, it has been the custom, using Western U.S.A. copper ore containing about 1% copper, predominantly sulfides, including chalcocite and chalcopyrite; to conduct a rougher float, floating hard, with a discardable tail, and a low grade but high recovery concentrate. This rougher concentrate has then been run through a first cleaner float to give a high grade concentrate ready for the smelter, and the first cleaner tail is put through a second cleaner float, recycling the second cleaner concentrate to the feed for the first cleaner float and discarding the second cleaner tail. The recirculating load from the second cleaner float to the first cleaner feed has on occasion been treated by additional grinding or with other methods to attempt to free the desired copper-containing ore and give an increased recovery with a high grade concentrate. The two objectives are not compatible and a compromise has been necessary.

Using the process of this invention the rougher float can be even more rigorous to give a tail containing less than 0.1% copper, after which the rougher concentrate is used as a feed for a cleaner float. This first cleaner float is conducted to secure a concentrate of increased grade, frequently from 3–5% higher grade as copper than previously possible, and the tails from the first cleaner float are used as a feed for a second cleaner float, which floats hard, to give a discardable tail of low grade and a second cleaner concentrate of comparatively low grade and containing copper ore, frequently almost locked in gangue. This second cleaner concentrate is then leached with cyanide, using the process as described in Example 1, which permits the recovery of a higher percentage of copper than had previously been possible using flotation schemes. The leach tails are refloated to recover any residual chalcopyrite which has not been dissolved, and which by the leach treatment is freed so as to float very easily.

Presently, economic considerations tend towards a rougher float which may be followed by a scavenger float to give a very low grade discardable tail with the concentrate from these floats of lower grade than commercially practiced today being treated with almost a scalping float to give a very high grade concentrate for the smelter, which is followed by a second cleaner float. This second cleaner float concentrate has a lower grade and contains most of the difficultly treatable portions and it is this second cleaner concentrate that can be most economically treated with cyanide. By avoiding a circulating load from the second cleaner back into an earlier portion of the circuit regrinding can be avoided and the circulating load reduced. It is to be understood, of course, that the point at which the cyanide extraction occurs and the relative proportions as optimized for each mine by adjusting the degree of grinding, the choice of treating slimes and sands separately, the grade of recovery of each float, the number of floats and the portion and proportion selected for cyanide treatment. Economic considerations of cost of mining, cost of grinding, cost of chemicals and copper price as well as equipment available are each factors to be considered in selecting the exact points for most economic recovery of copper at a particular time and place. Such minor variations are, of course, conventional process developments obvious to those skilled in the art from the above disclosures that are within the scope of the present invention.

I claim:
1. A process for recovering cyanide for use in the recovery of copper from a copper-containing ore fraction, comprising
   (a) contacting and thereby leaching, in at least one stage, a finely divided copper-containing ore fraction with an aqueous alkaline solution containing a total of about 3 to 4.5 moles of cyanide per mole of extractable copper,
   (b) for a time less than about four hours, thereby dissolving a major portion of the copper in said ore fraction as cuprocyanide in said alkaline solution,
   (c) separating the alkaline solution containing the dissolved copper from the cyanide insoluble residue,
   (d) adding sufficient of a water-soluble sulfide to said solution so that the total of sulfide plus thiocyanate plus ferrocyanide is about the stoichiometric equivalent of the dissolved copper,
   (e) adding acid to a pH below 5 to said solution thereby precipitating the copper and freeing hydrocyanic acid thus forming an aqueous slurry,
   (f) stripping the hydrocyanic acid as a gas from the aqueous slurry,
   (g) recovering and reusing the hydrocyanic acid stripped from said slurry and
   (h) separating and recovering the now insoluble copper compounds from the stripped slurry.

2. In the recovery of copper from a copper-containing ore fraction, by leaching with an aqueous alkaline solution containing 3 to 4.5 moles of cyanide ions per mole of extractable copper, in combination therewith the improvement which comprises:
   (a) adding sufficient of a water soluble sulfide so that enough sulfide ions plus thiocyanate ions plus ferrocyanide ions are present to react with all of the copper present,
   (b) adding sufficient sulfuric acid to lower the pH to at least below 5, thereby
   (c) precipitating the copper as cuprosulfide, copper thiocyanate and cuprous ferrocyanide, and
   (d) releasing the cyanide as HCN in the resulting slurry,
   (e) passing steam through the slurry thereby vapor phase stripping the HCN,
   (f) separating and condensing the cyanide containing steam, after passage through the slurry, thereby forming an aqueous solution of HCN, and thus recovering the HCN, and
   (g) recycling the thus recovered HCN to a subsequent leaching operation of additional ore fraction.

3. The process of claim 1 in which steam is internally generated by heating the acidified cyanide-containing solution and the generated steam carries over HCN in the vapor phase, thereby stripping the liquor, and the HCN-containing steam is condensed, thereby recovering a dilute aqueous HCN liquor which is subsequently used as a source of cyanide for leaching a copper-containing ore fraction.

4. The process of claim 1 in which the acidified cyanide-containing solution is steam stripped and the HCN-containing steam is contacted with an alkaline absorbent, thereby absorbing the HCN.

5. The process of claim 1 in which HCN is stripped from the cyanide-containing acidified leach liquor by passing a gas through said liquor, thereby entraining HCN in said gas, passing the gas-containing HCN to an absorber and absorbing the HCN therefrom.

6. The process of claim 5 in which said gas is air.

7. The process of claim 5 in which said gas is an inert gas, whereby the risk from an explosive mixture are avoided.

8. The process of claim 5 in which the HCN is absorbed with a sodium hydroxide solution, thereby forming a solution of NaCN and which NaCN solution is introduced into a subsequent ore fraction leaching operation.

9. The process of claim 5 in which the HCN is absorbed with a lime-containing solution, thereby forming a $Ca(CN)_2$ solution and which $Ca(CN)_2$ solution is introduced into a subsequent ore fraction leaching operation.

10. The process of claim 1 in which the vapor phase stripped HCN is absorbed in an alkaline suspension of a copper-containing ore fraction.

11. The process of claim 10 in which the HCN is stripped by steam, and the steam-containing HCN is absorbed in an alkaline suspension of a copper-containing ore fraction, thereby recovering both cyanide and heat.

12. The process of claim 10 in which the HCN is stripped by air.

13. The process of claim 10 in which the HCN is stripped by an inert gas, whereby the risks from an explosive mixture are avoided.

References Cited

UNITED STATES PATENTS

| | | | |
|---|---|---|---|
| 820,813 | 5/1906 | Muffly | 75—106 |
| 1,183,086 | 5/1916 | Layng | 75—106 |
| 1,654,918 | 1/1928 | Buchanan et al. | 75—106 |
| 1,658,249 | 2/1928 | McCluskey | 75—106 |
| 1,992,060 | 2/1935 | Ewan et al. | 75—106 |
| 3,189,435 | 6/1965 | Lower | 75—106 |
| 3,224,835 | 12/1965 | Hockings et al. | 75—106 |

HYLAND BIZOT, *Primary Examiner.*